US010614721B2

(12) United States Patent
Boss et al.

(10) Patent No.: US 10,614,721 B2
(45) Date of Patent: Apr. 7, 2020

(54) PROVIDING PARKING ASSISTANCE BASED ON MULTIPLE EXTERNAL PARKING DATA SOURCES

(71) Applicant: INTERNATIONAL BUSINESS MACHINES CORPORATION, Armonk, NY (US)

(72) Inventors: Gregory J. Boss, Saginaw, MI (US); Jeremy R. Fox, Georgetown, TX (US); Andrew R. Jones, Round Rock, TX (US); Kevin C. McConnell, Austin, TX (US); John E. Moore, Jr., Brownsburg, IN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 24 days.

(21) Appl. No.: 15/617,371

(22) Filed: Jun. 8, 2017

(65) Prior Publication Data
US 2018/0357905 A1 Dec. 13, 2018

(51) Int. Cl.
G08G 1/16 (2006.01)
G06F 16/583 (2019.01)
G08G 1/14 (2006.01)
H04W 4/40 (2018.01)
G08G 1/01 (2006.01)
B62D 15/02 (2006.01)
(Continued)

(52) U.S. Cl.
CPC ............ *G08G 1/168* (2013.01); *B62D 15/027* (2013.01); *B62D 15/028* (2013.01); *B62D 15/0285* (2013.01); *G06F 16/5838* (2019.01); *G08G 1/012* (2013.01); *G08G 1/0116* (2013.01); *G08G 1/04* (2013.01); *G08G 1/143* (2013.01); *H04W 4/024* (2018.02); *H04W 4/029* (2018.02); *H04W 4/40* (2018.02); *B60R 2300/806* (2013.01)

(58) Field of Classification Search
None
See application file for complete search history.

(56) References Cited

U.S. PATENT DOCUMENTS 6,950,035 B2  9/2005  Tanaka et al.
7,043,346 B2  5/2006  Kubota et al.
(Continued)

OTHER PUBLICATIONS

Boss et al., Specification and Drawings "Vehicular Collaboration for Vehicular Blind Spot Detection" for U.S. Appl. No. 15/337,240, filed Oct. 28, 2016, 48 pages.
(Continued)

*Primary Examiner* — James J Yang
*Assistant Examiner* — Kevin Lau
(74) *Attorney, Agent, or Firm* — Brian Restauro; Andrew D. Wright; Roberts Mlotkowski Safran Cole & Calderon, P.C.

(57) ABSTRACT

A computer-implemented method includes: receiving, by a computing device, parking related data from a plurality of external data sources, wherein the external data sources are implemented externally and independently of a vehicle; generating, by the computing device, parking guidance for assisting a driver of the vehicle to park in an open parking space based on the parking related data received from the plurality of external data sources; and presenting, by the computing device, the parking guidance to the driver of the vehicle.

17 Claims, 8 Drawing Sheets

(51) Int. Cl.
*H04W 4/029* (2018.01)
*H04W 4/024* (2018.01)
*G08G 1/04* (2006.01)

(56) References Cited

U.S. PATENT DOCUMENTS

| | | |
|---|---|---|
| 7,825,828 B2 | 11/2010 | Watanabe et al. |
| 8,825,262 B2 | 9/2014 | Lee et al. |
| 9,294,733 B2 | 3/2016 | Watanabe et al. |
| 2007/0282489 A1* | 12/2007 | Boss .................. B62D 15/0285 |
| | | 701/2 |
| 2010/0235053 A1 | 9/2010 | Iwakiri et al. |
| 2011/0013201 A1* | 1/2011 | Scherl ................... G01S 17/936 |
| | | 356/628 |
| 2013/0265423 A1 | 10/2013 | Bernal et al. |
| 2014/0292542 A1* | 10/2014 | Bruning ............... B62D 15/027 |
| | | 340/932.2 |
| 2014/0293001 A1 | 10/2014 | Yu et al. |
| 2016/0284217 A1* | 9/2016 | Lee ......................... G08G 1/143 |
| 2017/0109942 A1* | 4/2017 | Zivkovic ................ G06Q 10/02 |
| 2017/0243072 A1* | 8/2017 | Herman .................... B60R 1/00 |

OTHER PUBLICATIONS

Hu et al., "Sensor network based parking management", 25th International Conference on Computer Applications in Industry and Engineering, New Orleans, Louisiana, Nov. 14-16, 2012, 15 pages.
Mell et al., "The NIST Definition of Cloud Computing", NIST, Special Publication 800-145, Sep. 2011, 7 pages.

\* cited by examiner

PROVIDING PARKING ASSISTANCE BASED ON MULTIPLE EXTERNAL PARKING DATA SOURCES

BACKGROUND

The present invention generally relates to processing parking data for providing parking guidance and, more particularly, to processing parking data from multiple external sources for providing parking guidance.

Vehicles may be equipped with parking aids, such as proximity sensors, cameras, or the like. Such aids may assist a user in parking a vehicle by providing a display of the vehicle's surroundings, and providing alerts when the vehicle is at risk for a collision during a parking operation. Data used to assist the user in parking may be from local sources (e.g., sensors/cameras implemented within the vehicle).

SUMMARY

In an aspect of the invention, a computer-implemented method includes: receiving, by a computing device, parking related data from a plurality of external data sources, wherein the external data sources are implemented externally and independently of a vehicle; generating, by the computing device, parking guidance for assisting a driver of the vehicle to park in an open parking space based on the parking related data received from the plurality of external data sources; and presenting, by the computing device, the parking guidance to the driver of the vehicle.

In an aspect of the invention, there is a computer program product for aiding a driver in parking a vehicle based on parking related data, the computer program product comprising a computer readable storage medium having program instructions embodied therewith. The program instructions are executable by a computing device to cause the computing device to: receive the parking related data from the plurality of external data sources that are implemented externally and independently of a vehicle; determine relevant parking related data based on comparing the received parking related data with datasets defining the relevant parking related data; and present the relevant parking related data to the driver of the vehicle.

In an aspect of the invention, a system includes: a CPU, a computer readable memory and a computer readable storage medium associated with a computing device; program instructions to receive parking related data from a plurality of external data sources, wherein the external data sources are implemented externally and independently of a vehicle; program instructions to generate parking guidance for assisting a driver of the vehicle to park in an open parking space based on the parking related data received from the plurality of external data sources; program instructions to present the parking guidance to the driver of the vehicle; and program instructions to present the parking related data to the driver of the vehicle. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
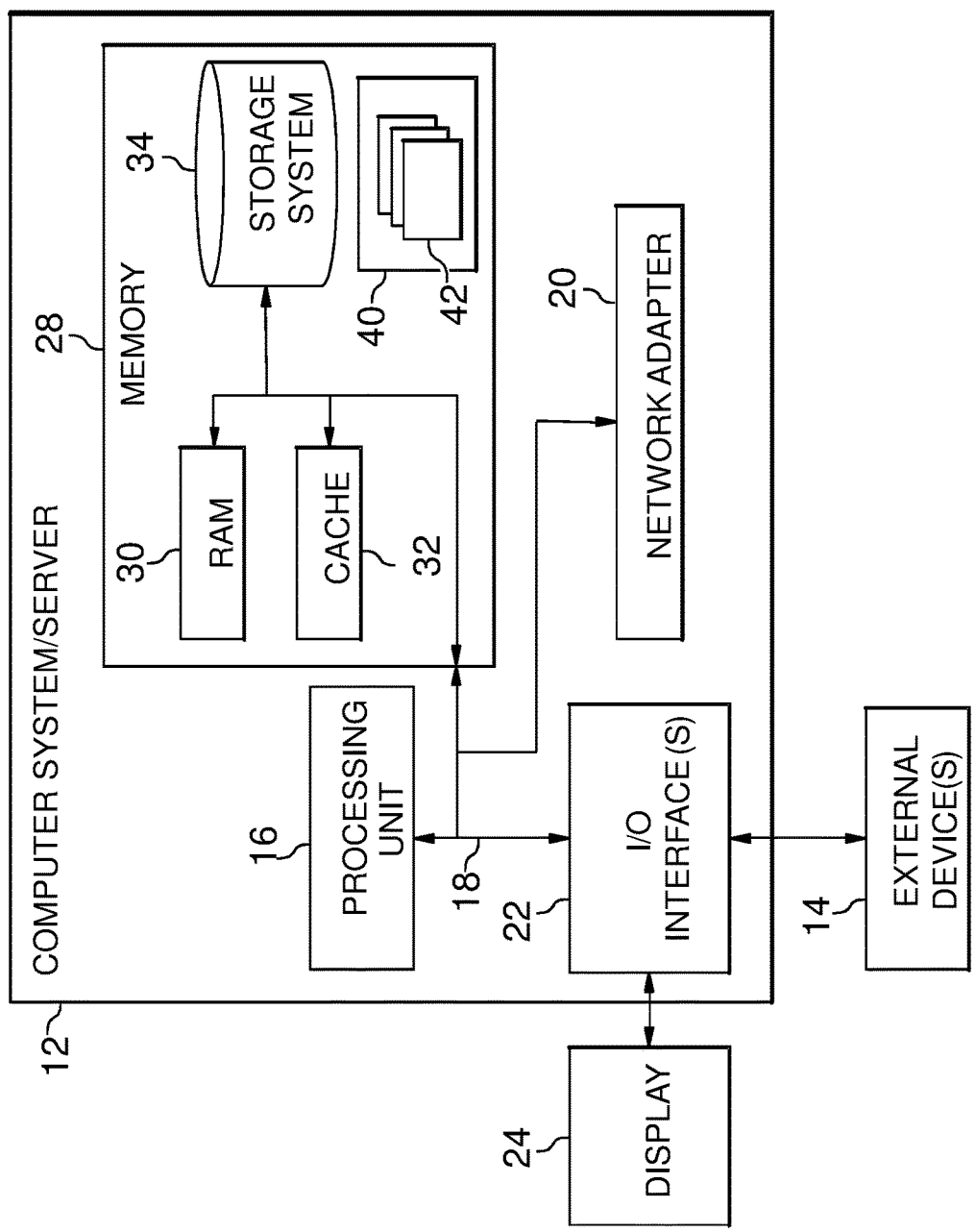
FIG. 1 depicts a cloud computing node according to an embodiment of the present invention.

The present invention generally relates to processing parking data for providing parking guidance and, more particularly, to processing parking data from multiple external sources for providing parking guidance. Aspects of the present invention may obtain parking data (e.g., sensor data, camera/video data, audio data, or the like) from multiple external sources (e.g., traffic cameras, fixed sensors are parking facilities or streets, etc.), and use the external sensor data to determine parking instructions for aiding a driver in parking a vehicle. Aspects of the present invention may use internal parking data (e.g., data from sensors, cameras, etc. implemented within the vehicle) in conjunction with the external parking data for determine parking instructions.

Aspects of the present invention may output the parking instructions and relevant video feeds to a display implemented within the vehicle to aid the driver in parking the vehicle. Additionally, or alternatively, aspects of the present invention may output the parking instructions to an autonomous vehicle system to improve parking operations by the autonomous vehicle. In this way, the likelihood of collisions and damage are reduced during parking operations. Further, aspects of the present invention may continue to monitor parking data from external and local sources and may alert the driver of potential hazards that arise during a parking operation (e.g., an approaching animal, pedestrian, jogger, biker, etc., within the vicinity of the vehicle). In this way, safety is improved during parking operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
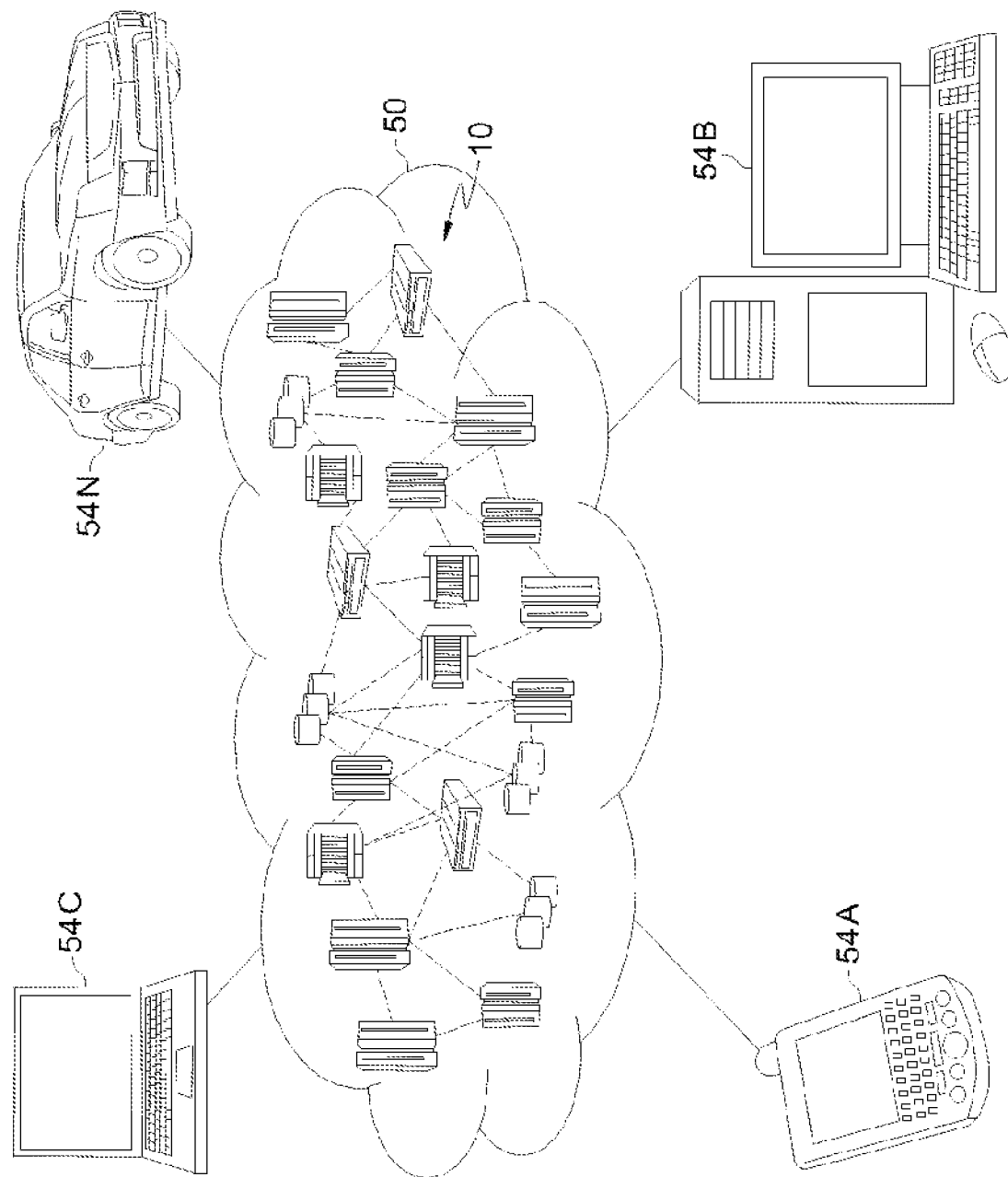
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
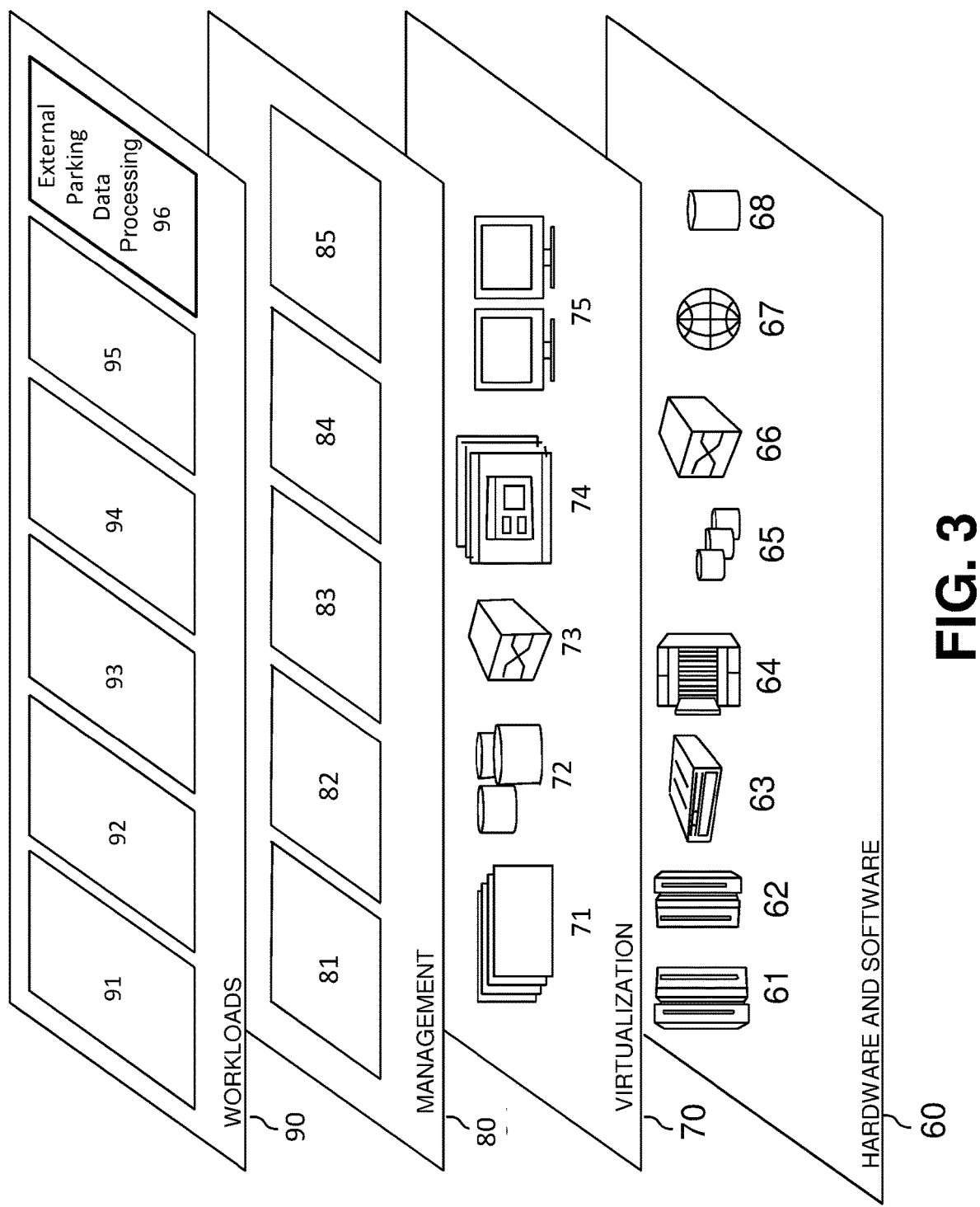
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and external parking data processing 96.

Referring back to FIG. 1, the program/utility 40 may include one or more program modules 42 that generally carry out the functions and/or methodologies of embodiments of the invention as described herein (e.g., such as the functionality provided by external parking data processing 96). Specifically, the program modules 42 may receive parking data across multiple external sources, determine relative parking data for parking guidance generation and presentation, process relevant parking data for generating parking guidance, and present the relevant parking data and parking guidance. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a parking assistance device as shown in FIG. 4.

Figure 4:
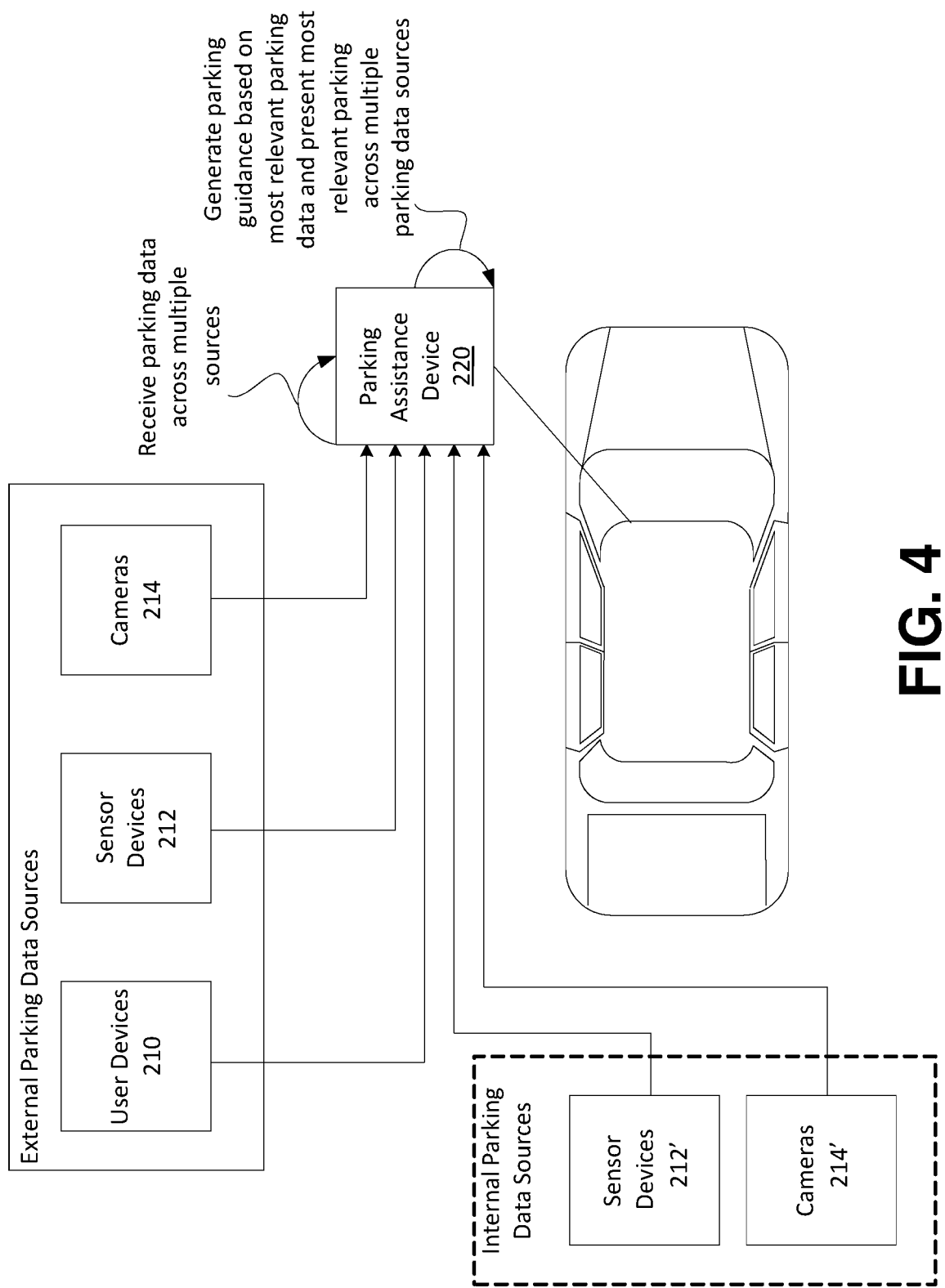
FIG. 4 shows an overview of an example implementation in accordance with aspects of the present invention

FIG. 4 shows an overview of an example implementation in accordance with aspects of the present invention. As shown in FIG. 4, a parking assistance device 220 may be implemented within a vehicle. The parking assistance device 220 may receive parking data across multiple sources (step 1.1). For example, the parking assistance device 220 may receive parking data from one or more external parking data sources (e.g., devices that are implemented externally to the vehicle, such as user devices 210, sensor devices 212, and/or cameras 214 implemented externally to the vehicle and externally to the parking assistance device 220). In embodiments, the parking assistance device 220 may receive the parking data from external parking data sources that implemented within a parking facility (e.g., parking lot or garage), or on curbsides for on-street parking spaces. As described herein, the parking assistance device 220 may receive the parking data based on detecting the start of a parking operation (e.g., the vehicle being placed in a reverse gear). Additionally, or alternatively, the parking assistance device 220 may receive the parking data based on entering a parking facility (e.g., by determining that the vehicle's location corresponds to the location of a parking facility, and/or by receiving communications from a communications device implemented within the parking facility).

As described herein, the parking assistance device 220 may receive parking data such as image/video data, sensor data, or the like, which may be used to assist the driver in parking the vehicle (e.g., by using the parking data to generate guidance for display on a vehicle navigation or similar system). For example, the parking assistance device 220 may receive image/video data from traffic cameras, security cameras, cameras implemented by other vehicles, or other types of cameras 214 to obtain a 360-degree view of the vehicle's surroundings and to obtain analytical data of a prospective parking space (e.g., the dimensions of the parking space). The parking assistance device 220 may also receive sensor data that may be used to assist the driver for parking. For example, the parking assistance device 220 may receive sensor data, such as object detection data (e.g., to determine the dimensions of an open parking space based on the position of vehicles adjacent to the open parking space). The external sensor devices 212 may be implemented within other vehicles or may be implemented within a parking facility or along a roadside in which street parking is present.

As described herein, the parking assistance device 220 may also receive parking data (e.g., video data) from a user device 210 used by an individual that takes live video of the vehicle's surroundings from outside the vehicle. For example, the user device 210 may serve as "an extra set of eyes" for the driver when another individual used the user device 210 to capture live video of the vehicle at a particular angle during a parking operation. The parking assistance device 220 may also receive data from internal sensor devices 212 (e.g., object detection sensors or the like). In embodiments, the parking assistance device 220 may also receive parking data from internal parking data sources (e.g., devices that are implemented internally within the vehicle, such as sensor devices 212', and/or cameras 214' implemented internally or integrally with the vehicle and with the parking assistance device 220).

Based on receiving the external and internal parking data, the parking assistance device 220 may, at step 1.2, determine the most relevant parking data, generate parking guidance based on the most relevant parking data (e.g., most useful video/images, sensor data etc.), and present the most relevant parking data and guidance (e.g., to a display implemented within a vehicle navigation system of the vehicle, or to a user device 210 of the driver, etc.). For example, the parking assistance device 220 may determine that not all the parking data may be useful or relevant, and thus, the parking assistance device 220 may prune the parking data for the most relevant parking data. Further, the parking assistance device 220 may use the most relevant parking data for generating parking guidance, and for display to the driver. As an example, the parking assistance device 220 may determine that certain video feeds may not be useful in assisting the driver with parking, and thus, the parking assistance device 220 may not present those video feeds (e.g., video feeds having poor image quality or poor views of an open parking space).

As described herein, the parking assistance device 220 may determine the most relevant parking data based on a set of pre-configured rules, criteria, and/or data that defines relevant parking data. For example, the parking assistance device 220 may compare parking data (e.g., images, videos, sensor data, etc.) with data sets consistent with pre-defined relevant parking data. The parking assistance device 220 may filter out or prune out parking data whose raw data or payload is inconsistent with the data sets defining relevant parking data to a threshold degree, and retain parking data that is consistent with the pre-defined relevant parking data sets. In practice, the most relevant parking data (e.g., the most useful parking data) may include video/images and/or sensor data that most clearly show the vehicle's surroundings and are most helpful in assisting the driver with parking the vehicle. In embodiments, relevant parking data may include sensor data and/or video/image data that may be used to accurately identify the dimensions and position of an open parking space, which, in turn, may be used for generating parking guidance instructions for the driver. The parking assistance device 220 may generate parking guidance based on the relevant/useful parking data, and may further provide the parking guidance and/or the most relevant images/video views to the driver. In this way, the driver is not flooded with excessive images, videos, and data that may confuse the driver and may not be helpful for the driver. Further, the parking guidance instructions are more useful and accurate when generated based on the most relevant parking data.

As described herein, during a parking operation, the parking assistance device 220 may monitor image, video, sensor, and/or other parking data and provide alerts to the user based on detecting a potential hazard from the parking data (e.g., the presence of an approaching pedestrian, biker, animal, and/or other object). In this way, safety is improved by reducing the risk of collisions during a parking operation when visibility and driver awareness of surroundings may typically be compromised.

Figure 5:
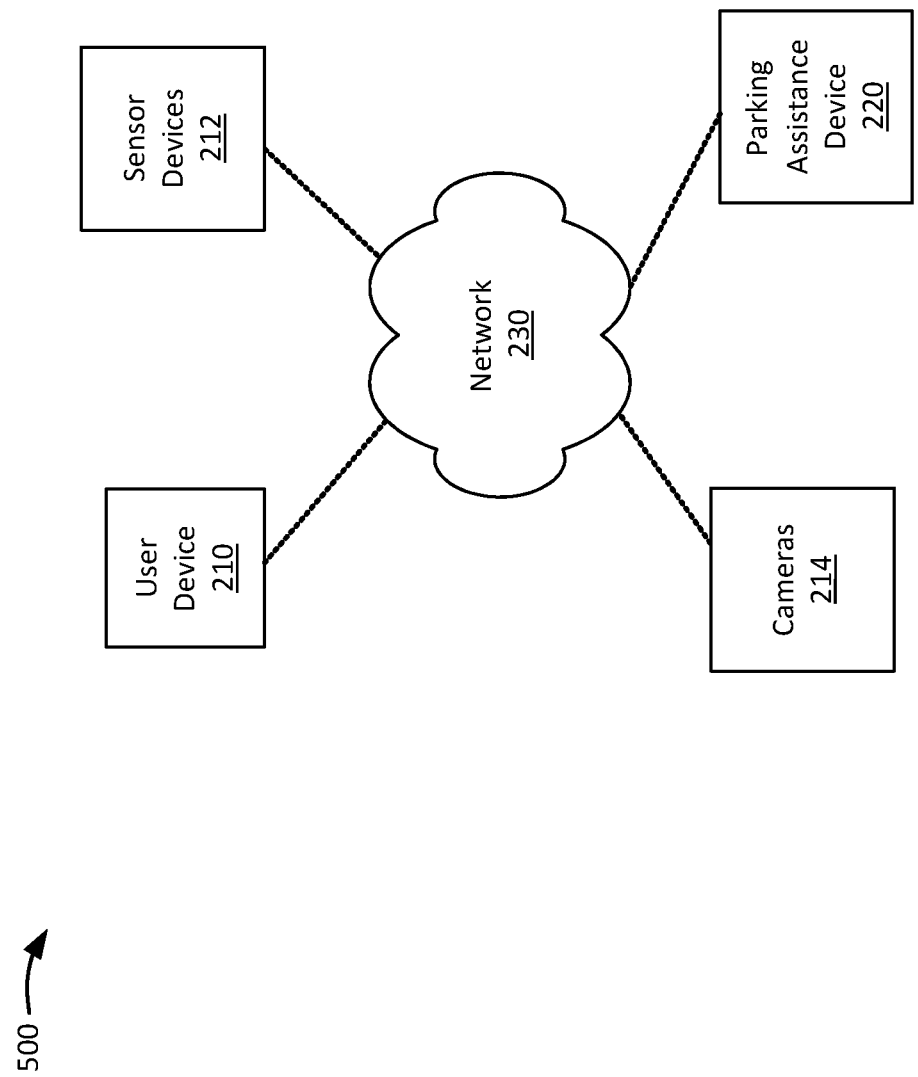
FIG. 5 shows an example environment in accordance with aspects of the present invention.

FIG. 5 shows an example environment in accordance with aspects of the present invention. As shown in FIG. 5, environment 500 may include a user device 210, sensor devices 212, cameras 214, a parking assistance device 220, and a network 230. In embodiments, one or more components in environment 500 may correspond to one or more components in the cloud computing environment of FIG. 2.

In embodiments, one or more components in environment 500 may include the components of computer system/server 12 of FIG. 1.

The user device 210 may include a computing device capable of communicating via a network, such as the network 230. For example, the user device 225 may correspond to a mobile communication device (e.g., a smart phone or a personal digital assistant (PDA)), a portable computer device (e.g., a laptop or a tablet computer), or another type of device. In embodiments, the user device 210 may also include a navigation system for a vehicle via which a driver may view parking data (e.g., camera/image views, sensor data, etc.) and parking guidance. In embodiments, the user device 210 may be used as a video source for providing parking assistance to a user (e.g., when a user of the user device 210 is located externally to the vehicle and captures video of the vehicle's surroundings to aid the driver in parking the vehicle).

The sensor devices 212, 212' may include object detection sensors, proximity sensors, heat sensors, and/or other types of sensors. In embodiments, the sensor devices 212, 212' may be implemented as internal or external parking data sources (e.g., implemented within a vehicle or externally to a vehicle, such as in a parking facility, roadside, or other vehicles). The sensor devices 212, 212' may be used to identify open parking spaces and attributes of the open parking spaces (dimensions, position, type, etc.). In embodiments, certain sensor data reported by the sensor devices 212, 212' may also be displayed to the user as it relates to aiding the user in parking a vehicle in an open parking space.

The cameras 214, 214' may include traffic cameras, vehicle cameras, security cameras, or the like. The cameras 214, 214' may be implemented as internal or external parking data sources (e.g., implemented within a vehicle or externally to a vehicle, such as in a parking facility, roadside, or other vehicles). Video and/or images captured by the cameras 214, 214' may be displayed by a user device 210 (e.g., a navigation system implemented within a vehicle).

The parking assistance device 220 may include one or more computing devices (e.g., such as computer system/server 12 of FIG. 1) that receives parking data from one or more user devices 210, sensor devices 212, 212', and/or cameras 214, 214'. The parking assistance device 220 may be implemented within a vehicle and may receive parking data from internal parking data sources (e.g., devices incorporated within the vehicle) and/or external parking data sources (e.g., devices incorporated externally of the vehicle). The parking assistance device 220 may process the parking data to generate parking guidance and present relevant parking data (e.g., most useful camera views/images, sensor data, etc.) to the driver via a user device 210 associated with the driver or a user device 210 implemented within the vehicle (e.g., a vehicle navigation system, or the like).

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
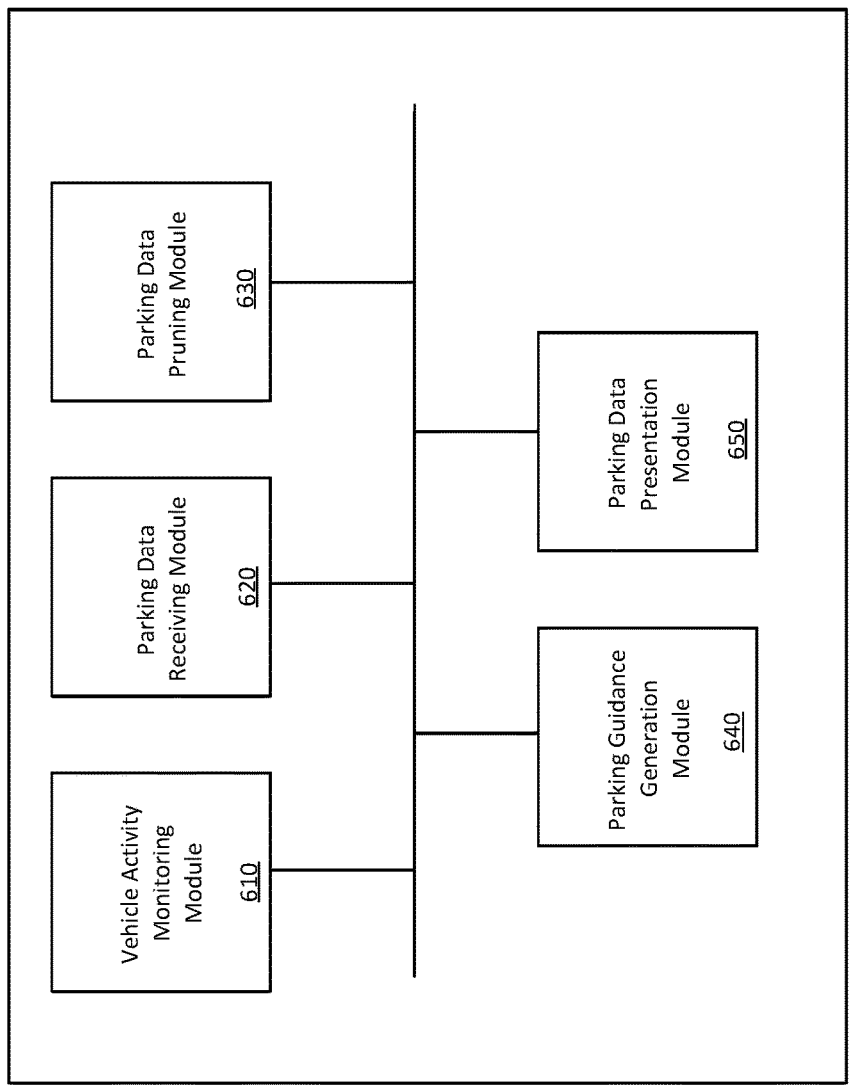
FIG. 6 shows a block diagram of example components of a parking assistance device in accordance with aspects of the present invention.

FIG. 6 shows a block diagram of example components of a parking assistance device in accordance with aspects of the present invention. As shown in FIG. 6, the parking assistance device 220 may include a vehicle activity monitoring module 610, a parking data receiving module 620, a parking data pruning module 630, a parking guidance generation module 640, and a parking data presentation module 650. In embodiments, the parking assistance device 220 may include additional or fewer components than those shown in FIG. 6. In embodiments, separate components may be integrated into a single computing component or module. Additionally, or alternatively, a single component may be implemented as multiple computing components or modules.

The vehicle activity monitoring module 610 may include a program module (e.g., program module 42 of FIG. 1) that may monitor vehicle activity and detect a parking event based on the vehicle activity. For example, the vehicle activity monitoring module 610 may detect a parking event when the vehicle is placed in a reverse gear. Additionally, or alternatively, the vehicle activity monitoring module 610 may detect a parking event based on receiving a communication from a communications device (e.g., beacon, network device, or the like) implemented within a parking a facility or street parking space. Additionally, or alternatively, the vehicle activity monitoring module 610 may detect a parking event when the vehicle enters a parking facility (e.g., based on the location of the vehicle and the location of the parking facility).

The parking data receiving module 620 may include a program module (e.g., program module 42 of FIG. 1) that may establish network communications with multiple external sources and receive parking data from external sources such as external user devices 210, sensor devices 212, and/or cameras 214. In embodiments, the parking data receiving module 620 may establish the network communications and receive the parking data based on the vehicle activity monitoring module 610 detecting the parking event. The parking data receiving module 620 may receive parking data (e.g., sensor data) from external sensor devices 212 implemented at a parking facility or roadside. Additionally, or alternatively, the parking data receiving module 620 may receive image/video data from external cameras 214 implemented at a parking facility or roadside. Additionally, or alternatively, the parking data receiving module 620 may receive image/video data from external user devices 210 (e.g., video captured by a user standing exterior to the vehicle to provide an extra video angle of the vehicle).

Additionally, the parking data receiving module 620 may receive parking data from internal parking data sources.

The parking data pruning module 630 may include a program module (e.g., program module 42 of FIG. 1) that may determine relevant parking data for generating parking guidance and for display. In particular, the parking data pruning module 630 may prune (e.g., analyze and filter) the parking data received across multiple external sources, and/or the parking data received across internal sources. As described herein, the parking data pruning module 630 may filter out or prune out non-relevant parking data, and retain relevant parking data. As described herein, relevant parking data (e.g., the most useful parking data) may include video/images and/or sensor data that most clearly show the vehicle's surroundings and are most helpful in assisting the driver with parking the vehicle in an open parking space in which the driver is attempting to park. As described herein, the parking data pruning module 630 may determine which open parking space the driver is attempting to park based on vehicle movement, reverse gear status, turn signal status, and/or other vehicle activity that indicates which open parking space the driver is attempting to park (e.g., based on information received and/or monitored by the vehicle activity monitoring module 610). The parking data pruning module 630 may compare the raw data or payload of the parking data and compare the raw data or payload to datasets defining raw data consistent with relevant parking data.

The parking guidance generation module 640 may include a program module (e.g., program module 42 of FIG. 1) that may generate parking guidance to guide the driver for parking in a previously identified open parking space (e.g., as identified by the parking data pruning module 630). In embodiments, the parking guidance may be based on parking dimensions, positions, and/or other attributes of the open parking space as determined from the relevant parking data. In embodiments, the parking guidance may include graphics, parking instructions in a text format, graphical guidelines superimposed on a live video received from an external camera 214 showing the parking space and vehicle, and/or other information that instruct and guide a driver for parking in the open parking space.

The parking data presentation module 650 may include a program module (e.g., program module 42 of FIG. 1) that may present the most relevant parking data to the driver (e.g., via a navigation system within the vehicle, the driver's user device 210, etc.). For example, the parking data presentation module 650 may present the most relevant video/image feeds to the driver. In embodiments, the parking data presentation module 650 may also present the parking guidance.

Figure 7:
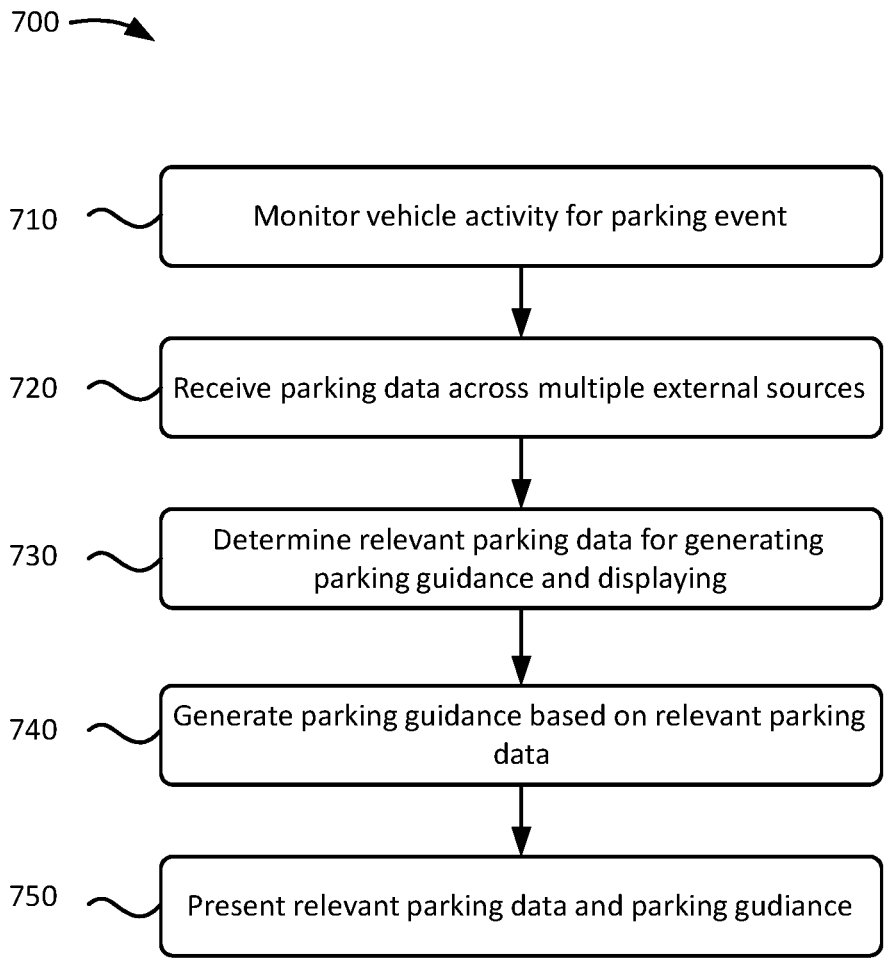
FIG. 7 shows an example flowchart of a process for generating parking guidance based on data from multiple external parking data sources in accordance with aspects of the present invention.

FIG. 7 shows an example flowchart of a process for generating parking guidance based on data from multiple external parking data sources in accordance with aspects of the present invention. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 may include monitoring vehicle activity for triggering event (step 710). For example, as described above with respect to the vehicle activity monitoring module 610, the parking assistance device 220 may monitor vehicle activity for a parking event. For example, the parking assistance device 220 may detect a parking event when the vehicle is placed in a reverse gear. Additionally, or alternatively, the parking assistance device 220 may detect a parking event based on receiving a communication from a communications device (e.g., beacon, network device, or the like) implemented within a parking a facility or street parking space. Additionally, or alternatively, the parking assistance device 220 may detect a parking event when the vehicle enters a parking facility (e.g., based on the location of the vehicle and the location of the parking facility).

Process 700 may also include receiving parking data across multiple external sources (step 720). For example, as described above with respect to the parking data receiving module 620, the parking assistance device 220 may establish network communications with multiple external sources and receive parking data from external sources such as external user devices 210, sensor devices 212, and/or cameras 214. In embodiments, the parking assistance device 220 may establish the network communications and receive the parking data based on detecting the parking event (e.g., as described above with respect to process step 710). In particular, the parking assistance device 220 may receive parking data (e.g., sensor data) from external sensor devices 212 implemented at a parking facility or roadside. Additionally, or alternatively, the parking assistance device 220 may receive image/video data from external cameras 214 implemented at a parking facility or roadside. Additionally, or alternatively, the parking assistance device 220 may receive image/video data from external user devices 210 (e.g., video captured by a user standing exterior to the vehicle to provide an extra video angle of the vehicle). In embodiments, the parking assistance device 220 may receive parking data across multiple external sources throughout process 700. Additionally, the parking assistance device 220 may receive parking data from internal parking data sources.

Process 700 may further include determining relevant parking data for parking guidance generation and display (step 730). For example, as described above with respect to the parking data pruning module 630, the parking assistance device 220 may determine relevant parking data for generating parking guidance and for display. In particular, the parking assistance device 220 may prune the parking data received across multiple external sources, and/or the parking data received across internal sources. As described herein, the parking assistance device 220 may filter out or prune out non-relevant parking data, and retain relevant parking data. As described herein, relevant parking data (e.g., the most useful parking data) may include video/images and/or sensor data that most clearly show the vehicle's surroundings and are most helpful in assisting the driver with parking the vehicle in an open parking space in which the driver is attempting to park. As described herein, the parking assistance device 220 may determine which open parking space the driver is attempting to park based on vehicle movement, reverse gear status, turn signal status, and/or other vehicle activity that indicates which open parking space the driver is attempting to park.

In embodiments, relevant parking data may include sensor data and/or video/image data that may be used to accurately identify the dimensions and position of the open parking space, which, in turn, may be used for generating parking guidance instructions for the driver. Further, the parking assistance device 220 may determine which parking data (e.g., video/image feeds and/or other data) to display to a driver (e.g., to prevent the driver from being flooded with excessive images, videos, and data that may confuse the driver and may not be helpful for the driver). Additional details regarding determining the relevant parking data are described below with respect to FIG. 8.

Process 700 may also include generate parking guidance based on the relevant parking data (step 740). For example, as described above with respect to the parking guidance generation module 640, the parking assistance device 220 may generate parking guidance. As described herein, the parking assistance device 220 may generate parking guidance to guide the driver for parking in the previously identified open parking space (e.g., identified at step 730 as described above). In embodiments, the parking guidance may be based on parking dimensions, positions, and/or other attributes of the open parking space as determined from the relevant parking data. In embodiments, the parking guidance may include graphics, driver instructions, superimposed graphical guidelines, and/or other information that instruct and guide a driver for parking in the open parking space.

Process 700 may further include present the relevant parking data and the parking guidance (step 750). For example, as described above with respect to the parking data presentation module 650, the parking assistance device 220 may present the most relevant parking data to the driver (e.g., via a navigation system within the vehicle, the driver's user device 210, etc.). For example, the parking assistance device 220 may present the most relevant video/image feeds to the driver. In embodiments, the parking assistance device 220 may also display the parking guidance. The parking assistance device 220 may include a user interface via which the driver may modify or scroll through various video/image feeds as desired. In embodiments, the parking guidance may be used by an autonomous vehicle for parking the vehicle in the open parking space.

As described herein, the parking assistance device 220 may continue to receive and monitor parking data across multiple external sources. The parking assistance device 220 may provide an alert when detecting the presence of an object, animal, individual, etc. during a parking operation in which the driver's visibility/attention may normally be compromised. In this way, safety is improved by reducing the chances of a collision during a parking operation. Further, since external sources may be monitored, a more complete set of data and video of the vehicle's surroundings may be used to identify potential hazards in relation to when only internal sources are used. That is, augmenting parking data from internal sources with parking data from external sources improve the overall parking of vehicles, allowing the driver to park in relatively smaller spaces, and avoid collisions with other vehicles, objects, animals, and/or individuals.

Figure 8:
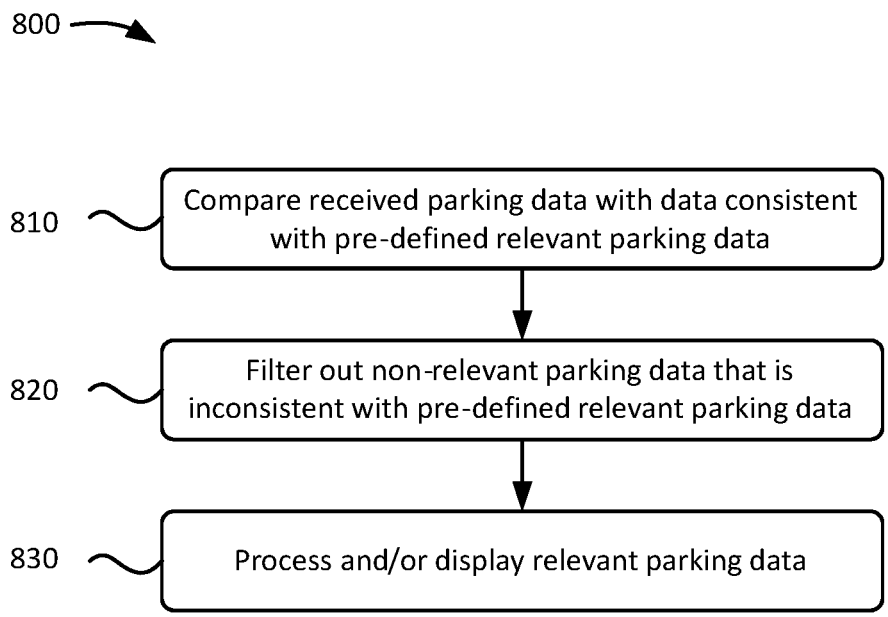
FIG. 8 shows an example flowchart of a process for filtering out non-relevant parking data and retaining relevant parking data for processing in accordance with aspects of the present invention.

FIG. 8 shows an example flowchart of a process for filtering out non-relevant parking data and retaining relevant parking data for processing in accordance with aspects of the present invention. The steps of FIG. 8 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention. In embodiments, the process shown in FIG. 8 may correspond to sub-steps of process step 730 in FIG. 7.

As shown in FIG. 8, process 800 may include comparing received parking data with data consistent with pre-defined relevant parking data (step 810). For example, the parking assistance device 220 may store a data set having data that defines what constitutes relevant parking data. As an example, the data set may include images, videos, sensor data, or the like that are consistent with relevant parking data (e.g., useful images of or videos showing clear views of an open parking space, or surroundings, useful sensor data that may be used to determine dimensions/position of the open parking space, etc.). In embodiments, the data set may include data gathered from experimental processes in which useful image data, video data, and sensor data are mapped to useful views of an open parking space and views of surrounding areas of the open parking space (e.g., views/data that may be useful to a drive when parking a vehicle, and may be best suited for generating parking guidance).

In embodiments, the parking assistance device 220 may compare received parking data (e.g., data received from internal and/or external parking data sources) with the data set. For example, image data received from a camera 214 (e.g., a traffic camera) may be compared to image data from the data set to determine whether the image data from the camera 214 is considered relevant. In embodiments, the parking assistance device 220 may implement pixel-based classification/comparison techniques to compare the image data receive from the camera 214 with the image data included in the data set. In a similar manner, the parking assistance device 220 may compare video data and sensor data received from internal and/or external user devices 210, sensor devices 212, and/or cameras 214 to determine which data is considered to be relevant or useful to the driver of a vehicle during a parking operation.

Process 800 may also include filtering out non-relevant parking data that is inconsistent with pre-defined relevant parking data (step 820). For example, the parking assistance device 220 may filter out non-relevant parking data based on comparing the parking data with the data set defining relevant parking data, as described above with respect to step 810. In embodiments, the parking assistance device 220 may filter or prune the non-relevant parking data such that the non-relevant parking data is not processed or used for generating parking guidance. In embodiments, the non-relevant parking data may not be initially presented to the driver (but may be made available to the driver via manual selection of the non-relevant parking data through a user interface of the driver's navigation system and/or user device 210).

Process 800 may further include processing and/or displaying the relevant parking data (step 830). For example, the parking assistance device 220 may process and/or display the relevant parking data. In particular, the parking assistance device 220 may process the relevant parking data by generating parking guidance (e.g., in a similar manner as described above with respect to step 740 of FIG. 7). Additionally, or alternatively, the parking assistance device 220 may display the relevant parking data (e.g., in a similar manner as described above with respect to step 750 of FIG. 7).

Aspects of the present invention may improve safety during a parking operation, and may further improve the ability for a driver to park in relatively smaller spaces, thus reducing the amount of space needed in parking facilities and street sides for parking. For example, aspects of the present invention may use external parking data from external sources to obtain clearer views of a vehicle's surroundings and of an open parking space during a parking operation. Further, aspects of the present invention may monitor external video sources to detect the presence of hazards, and alert the driver during a parking operation, thus reducing the chances of accidents.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a computing device, parking related data from a plurality of external data sources, wherein the external data sources are implemented externally and independently of a vehicle;
   determining, by the computing device, relevant parking related data by comparing the received parking related data with datasets defining the relevant parking related data, wherein the relevant parking related data includes a subset of the received parking related data;
   generating, by the computing device, parking guidance for assisting a driver of the vehicle to park in an open parking space based on and using the determined relevant parking related data including the subset of the received parking related data;
   presenting, by the computing device, the parking guidance to the driver of the vehicle; and
   pruning, by the computer device, the parking related data, wherein the generating the parking guidance is based on pruning the parking related data,
      wherein the parking related data includes a first video feed and a second video feed,
      the first video feed is pruned from the parking related data in that the first video feed is not included in the parking guidance, and
      the first video feed is pruned from the parking related data based on the first video feed showing surroundings of the vehicle less clearly than the second video feed.

2. The method of claim 1, further comprising detecting a parking event based on monitoring vehicle activity, wherein the receiving the parking related data is based on the detecting the parking event.

3. The method of claim 1, wherein the parking related data includes at least one from the group consisting of:
   video data;
   image data;
   object detection sensor data; and
   heat detection sensor data.

4. The method of claim 3, further comprising presenting the parking related data to the driver.

5. The method of claim 1, wherein the parking guidance includes at least one selected from the group consisting of:
   text with parking instructions; and
   superimposed graphical guidelines superimposed on a live video captured by one or more of the plurality of external data sources.

6. The method of claim 1, wherein the plurality of external data sources includes at least one selected from the group consisting of:
   a traffic camera;
   a security camera;
   an object detection sensor;
   a proximity sensor; and
   a heat sensor.

7. The method of claim 1, wherein the generating the parking guidance is further based on data received from one or more internal data sources integrated within the vehicle.

8. The method of claim 7, wherein the one or more internal data sources includes at least one selected from the group consisting of:
   a vehicle camera integrated within the vehicle;
   an object detection sensor; and
   a proximity sensor.

9. The method of claim 1, wherein a service provider at least one of creates, maintains, deploys and supports the computing device.

10. The method of claim 1, wherein the computing device includes software provided as a service in a cloud environment.

11. A computer program product for aiding a driver in parking a vehicle based on parking related data, the computer program product comprising a computer readable storage medium having program instructions embodied therewith, the program instructions executable by a computing device to cause the computing device to:
   receive the parking related data from the plurality of external data sources that are implemented externally and independently of the vehicle;
   determine relevant parking related data based on comparing the received parking related data with datasets defining the relevant parking related data, wherein the relevant parking related data includes a subset of the received parking related data;
   generate parking guidance for assisting the driver of the vehicle to park in an open parking space based on the relevant parking related data;
   present the parking guidance to the driver of the vehicle;
   present the relevant parking related data to the driver of the vehicle; and
   prune the parking related data, wherein the generating the parking guidance is based on pruning the parking related data,
      wherein the parking related data includes a first video feed and a second video feed, the first video feed is pruned from the parking related data in that the first video feed is not included in the parking guidance, and the first video feed is pruned from the parking related data based on the first video feed showing surroundings of the vehicle less clearly than the second video feed.

12. The computer program product of claim 11, wherein the program instructions to determine the relevant parking data further cause the computing device to compare raw data or payload of the parking related data with raw data or payload of the datasets.

13. The computer program product of claim 11 wherein the determining the relevant parking data set comprises:
    comparing the received parking related data with data consistent with pre-defined relevant parking data; and
    filtering out non-relevant parking data that is inconsistent with pre-defined relevant parking data based on the comparing.

14. The computer program product of claim 11, wherein the program instructions further cause the computing device to detect a parking event based on monitoring vehicle activity, wherein the receiving the parking related data is based on the detecting the parking event.

15. The computer program product of claim 11, wherein the plurality of external data sources includes at least one selected from the group consisting of:
    a user device;
    a traffic camera;
    a security camera;
    a vehicle camera integrated within another vehicle;
    an object detection sensor;
    a proximity sensor; and
    a heat sensor.

16. A system comprising:
    a CPU, a computer readable memory and a computer readable storage medium associated with a computing device;
    program instructions to receive parking related data from a plurality of external data sources, wherein the external data sources are implemented externally and independently of a vehicle;
    program instructions to determine relevant parking related data by comparing the received parking related data with datasets defining the relevant parking related data, wherein the relevant parking related data includes a subset of the received parking related data;
    program instructions to generate parking guidance for assisting a driver of the vehicle to park in an open parking space based on the relevant parking related data;
    program instructions to present the parking guidance to the driver of the vehicle;
    program instructions to present the parking related data to the driver of the vehicle; and
    program instructions to prune the parking related data to determine the relevant parking related data, wherein the generating the parking guidance and the presenting the parking related data is based on pruning the parking related data,
    wherein the parking related data includes a first video feed and a second video feed,
        the first video feed is pruned from the parking related data in that the first video feed is not included in the parking guidance, and
        the first video feed is pruned from the parking related data based on the first video feed showing surroundings of the vehicle less clearly than the second video feed,
    wherein the program instructions are stored on the computer readable storage medium for execution by the CPU via the computer readable memory.

17. The system of claim 16, wherein the pruning the parking related data comprises: filtering out non-relevant parking data that is inconsistent with pre-defined relevant parking data based on the comparing.

* * * * *